(12) United States Patent
Gesch et al.

(10) Patent No.: US 11,095,502 B2
(45) Date of Patent: Aug. 17, 2021

(54) ADHOC PROTOCOL FOR COMMISSIONING CONNECTED DEVICES IN THE FIELD

(71) Applicant: Otis Elevator Company, Farmington, CT (US)

(72) Inventors: Oliver Alexander Gesch, Berlin (DE); Aditya Swami, Hyderabad (IN); Luis C. Encinas Carreno, Farmington, CT (US); Markus Mueller, Berlin (DE); David Ginsberg, Granby, CT (US); Richard Buddelmann, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 49 days.

(21) Appl. No.: 15/803,726

(22) Filed: Nov. 3, 2017

(65) Prior Publication Data
US 2019/0140896 A1 May 9, 2019

(51) Int. Cl.
*H04L 12/24* (2006.01)
*B66B 5/00* (2006.01)
(Continued)

(52) U.S. Cl.
CPC ........ *H04L 41/0806* (2013.01); *B66B 5/0087* (2013.01); *B66B 19/00* (2013.01);
(Continued)

(58) Field of Classification Search
CPC ... B66B 5/0087; B66B 1/3407; B66B 1/3415; B66B 1/3446; B66B 1/3453;
(Continued)

(56) References Cited

U.S. PATENT DOCUMENTS 5,929,400 A    7/1999   Colby et al.
6,003,637 A * 12/1999   Kim ..................... B66B 1/34
                                                                 187/380
(Continued)

FOREIGN PATENT DOCUMENTS

CA        2812806 A1    10/2012
CN     102301738 A    12/2011
(Continued)

OTHER PUBLICATIONS

Chemical Processing, "Cloud-Based Configuration Offers Down-to-Earth Savings, by Amol Chaubal, Honeywell Process Solutions", www.chemicalprocessing.com, 3 pages.
(Continued)

*Primary Examiner* — Greg C Bengzon
(74) *Attorney, Agent, or Firm* — Cantor Colurn LLP

(57) ABSTRACT

A device commissioning system includes a terminal device, a data communication network, and a network controller. The terminal devices selects a device type of a component configured to operate in a control system, and outputs a device activation signal that requests a configuration file for commissioning the component according to a selected device type. The communication network is remotely located from the component and stores configuration files for commissioning different types of components. The network controller receives the device activation signal indicating a request to commission the component according to the selected device type and establishes a secure data link to deliver the configuration file in response to the device activation signal. The component receives the configuration file corresponding to the selected device type, and installs the configuration file to commission operation as the selected device type.

15 Claims, 4 Drawing Sheets

(51) Int. Cl.
*G06Q 10/00* (2012.01)
*G06Q 10/06* (2012.01)
*B66B 19/00* (2006.01)
*H04L 29/08* (2006.01)

(52) U.S. Cl.
CPC .............. *G06Q 10/06* (2013.01); *G06Q 10/20* (2013.01); *H04L 67/10* (2013.01)

(58) Field of Classification Search
CPC ... B66B 5/0025; B66B 25/006; B66B 1/3461; B66B 2201/4653; B66B 3/00; B66B 3/008; B66B 25/00; B66B 3/002; H04L 41/0806; H04L 67/10; H04L 67/12; H04L 67/125; H04L 12/2825; H04L 2012/285; H04L 41/0809; H04L 41/082; H04L 41/0843; H04L 41/0869; H04L 41/12; H04L 63/08; H04L 63/0823; H04L 63/168; H04L 63/20; H04L 67/02; H04L 67/1095; H04L 67/20; H04L 67/22; H04L 67/32; H04L 67/34; H04L 67/42; H04L 12/2803; H04L 12/2816; H04L 12/2829; H04L 41/0813; H04L 41/0886; H04L 41/0893; H04L 47/823; H04L 63/0807; H04L 63/0838; H04L 63/108; H04L 12/2807; H04L 41/0803; H04L 67/141; H04L 2209/24; H04L 63/0442; H04L 9/14; H04L 63/0428; H04L 63/123; H04L 9/30; H04W 76/10; H04W 84/12; H04W 12/04; H04W 12/06; H04W 12/08; H04W 24/02; H04W 28/18; H04W 4/24; H04W 4/70; H04W 4/80; H04W 8/183; H04W 8/205; H04W 8/22; H04W 40/24; H04W 80/00; H04W 24/00; H04W 40/246; H04W 4/38; H04W 12/10; G05B 15/02; G05B 2219/24033; G05B 2219/2614; G05B 2219/2642; G05B 2219/34477; G05B 19/0428; G05B 2219/25167; G05B 2219/2659; G05B 19/0426; G05B 19/401; G05B 19/4185; G06F 21/57; G06F 21/572; G06F 21/445; G06F 21/33; G06F 21/305; G06F 21/35; G06F 21/85; G06F 21/44; G06F 21/53; G06F 21/6218; G06F 8/60; G06F 8/61; G06F 8/62; G06F 3/0482; G06F 21/335; G06F 3/041; G06F 3/0484; G06F 3/04842; G06F 8/65; G06F 13/10; G06F 13/102; G06F 13/12; G06F 13/122; G06F 13/124; G06F 13/126; G06F 13/128; G06Q 10/0639; G06Q 10/20; G06Q 10/103; H05B 37/0272

See application file for complete search history.

(56) References Cited

U.S. PATENT DOCUMENTS

| | | | | |
|---|---|---|---|---|
| 6,349,795 B1* | 2/2002 | Tatsumi | ............... | B66B 1/34 187/247 |
| 6,427,807 B1* | 8/2002 | Henneau | ............... | B66B 1/34 187/247 |
| 6,471,014 B1* | 10/2002 | Daniel | ............... | B66B 5/0025 187/391 |
| 6,624,750 B1 | 9/2003 | Marman et al. | | |
| 7,069,333 B1* | 6/2006 | Morris | ............... | G06Q 10/06 709/232 |
| 7,073,633 B2 | 7/2006 | Weinberger et al. | | |
| 7,319,967 B2* | 1/2008 | Meyer | ............... | B66B 3/00 187/388 |
| 7,395,122 B2* | 7/2008 | Kreidler | ............ | G05B 19/0426 700/108 |
| 7,561,581 B2 | 7/2009 | Kim et al. | | |
| 7,636,343 B2 | 12/2009 | Mizukoshi | | |
| 7,697,893 B2 | 4/2010 | Kossi et al. | | |
| 7,853,210 B2 | 12/2010 | Meyers et al. | | |
| 7,933,594 B2* | 4/2011 | Nixon | ............... | H04W 40/24 455/428 |
| 8,422,401 B1 | 4/2013 | Choong | | |
| 8,560,012 B2 | 10/2013 | Ohnishi et al. | | |
| 8,634,821 B2* | 1/2014 | Raleigh | ............ | H04L 41/0806 455/419 |
| 8,676,219 B2 | 3/2014 | Pratt, Jr. et al. | | |
| 9,077,611 B2* | 7/2015 | Cordray | ............ | H04L 41/0213 |
| 9,246,757 B2 | 1/2016 | Balog et al. | | |
| 9,253,860 B2 | 2/2016 | Wang | | |
| 9,483,035 B2 | 11/2016 | Buchdunger et al. | | |
| 9,485,790 B2 | 11/2016 | Mathews et al. | | |
| 9,571,472 B2* | 2/2017 | Pochuev | ............ | H04L 63/0442 |
| 9,588,506 B1* | 3/2017 | Clayton | ............ | G05B 15/02 |
| 9,588,514 B2 | 3/2017 | Christensen et al. | | |
| 9,615,434 B2 | 4/2017 | Vangeel et al. | | |
| 9,647,726 B2* | 5/2017 | Schultz | ............ | H04B 5/0043 |
| 9,699,270 B2 | 7/2017 | Kande et al. | | |
| 9,787,853 B1* | 10/2017 | Balakrishnan | ......... | H04W 4/70 |
| 9,860,677 B1* | 1/2018 | Agerstam | ............ | H04L 67/28 |
| 9,912,733 B2* | 3/2018 | T | ............... | G06F 8/65 |
| 9,967,149 B1* | 5/2018 | Fiennes | ............... | H04W 76/10 |
| 9,984,348 B2* | 5/2018 | Skaaksrud | ............ | H04W 12/06 |
| 10,168,676 B2* | 1/2019 | Patel | ............... | H04L 12/2803 |
| 10,336,573 B2* | 7/2019 | Hovi | ............... | B66B 1/2408 |
| 10,361,867 B2* | 7/2019 | Ahokas | ............ | H04L 63/0435 |
| 2002/0173970 A1* | 11/2002 | Hamada | ............ | G06Q 10/10 705/305 |
| 2003/0040924 A1* | 2/2003 | Spoke, III | ............ | G06Q 10/06 705/302 |
| 2003/0057029 A1* | 3/2003 | Fujino | ............ | B66B 3/00 187/391 |
| 2004/0028023 A1 | 2/2004 | Mandhyan et al. | | |
| 2004/0094366 A1* | 5/2004 | Weinberger | ......... | B66B 5/0025 187/247 |
| 2004/0174904 A1 | 9/2004 | Kim et al. | | |
| 2005/0061586 A1* | 3/2005 | Engel | ............... | B66B 1/34 187/391 |
| 2006/0144646 A1* | 7/2006 | Engel | ............... | B66B 5/0087 187/391 |
| 2006/0159007 A1* | 7/2006 | Frutiger | ............ | H04L 41/0806 370/216 |
| 2007/0078956 A1* | 4/2007 | VanGompel | ......... | H04L 67/12 709/220 |
| 2007/0110010 A1* | 5/2007 | Kotola | ............ | H04W 4/021 370/338 |
| 2008/0208369 A1* | 8/2008 | Grgic | ............ | G06F 8/60 700/20 |
| 2008/0274766 A1 | 11/2008 | Pratt et al. | | |
| 2009/0314583 A1* | 12/2009 | Pustelniak | ......... | B66B 5/0087 187/247 |
| 2010/0185549 A1* | 7/2010 | York | ............ | G06F 3/04883 705/301 |
| 2010/0217657 A1* | 8/2010 | Gazdzinski | ......... | G06Q 30/0251 705/14.5 |
| 2011/0132699 A1* | 6/2011 | Tokura | ............ | B66B 3/00 187/382 |
| 2011/0315490 A1* | 12/2011 | Shi | ............... | B66B 5/0025 187/393 |
| 2012/0008529 A1* | 1/2012 | Averbuch | ............ | H04L 41/0806 370/255 |
| 2012/0116574 A1* | 5/2012 | Kangas | ............ | B66B 25/00 700/230 |
| 2013/0007693 A1* | 1/2013 | Bliss | ............ | G06F 8/63 717/101 |
| 2013/0056311 A1* | 3/2013 | Salmikuukka | ......... | B66B 1/468 187/380 |
| 2013/0211559 A1* | 8/2013 | Lawson | ............ | G06Q 10/06315 700/83 |

(56) References Cited

U.S. PATENT DOCUMENTS

| | | | |
|---|---|---|---|
| 2013/0223279 A1* | 8/2013 | Tinnakornsrisuphap | H04L 41/0809 370/254 |
| 2013/0246928 A1* | 9/2013 | Hovi | B66B 5/0025 715/738 |
| 2013/0291085 A1* | 10/2013 | Chong | G05B 19/048 726/10 |
| 2013/0294285 A1* | 11/2013 | Zhang | H04W 24/02 370/254 |
| 2014/0305747 A1* | 10/2014 | Kumar | B66B 1/468 187/381 |
| 2014/0336785 A1* | 11/2014 | Asenjo | G05B 19/4185 700/17 |
| 2014/0336786 A1* | 11/2014 | Asenjo | G05B 19/4185 700/17 |
| 2014/0337429 A1* | 11/2014 | Asenjo | H04L 65/403 709/204 |
| 2015/0045956 A1* | 2/2015 | Joyce | B66B 1/468 700/275 |
| 2015/0046710 A1* | 2/2015 | Clish | H04L 9/3273 713/169 |
| 2015/0113592 A1* | 4/2015 | Curtis | H04L 63/0823 726/2 |
| 2015/0113599 A1* | 4/2015 | Curtis | H04L 63/0428 726/4 |
| 2015/0113627 A1* | 4/2015 | Curtis | H04L 63/06 726/10 |
| 2015/0127174 A1* | 5/2015 | Quam | F24F 11/63 700/276 |
| 2015/0134733 A1* | 5/2015 | Maturana | H04L 43/04 709/203 |
| 2015/0154324 A1* | 6/2015 | Reilio | B66B 19/00 703/1 |
| 2015/0158699 A1* | 6/2015 | Haapaniemi | B66B 19/00 702/155 |
| 2015/0233790 A1 | 8/2015 | Ratilla et al. | |
| 2015/0274488 A1* | 10/2015 | Ramakrishnan | B66B 19/007 187/387 |
| 2015/0281319 A1* | 10/2015 | Maturana | G06F 9/5072 709/202 |
| 2015/0284214 A1* | 10/2015 | Park | B66B 5/0018 187/393 |
| 2015/0310674 A1* | 10/2015 | Humphrey | H04W 4/029 701/24 |
| 2015/0317645 A1* | 11/2015 | Kudrimoti | H04L 67/141 705/345 |
| 2015/0319552 A1* | 11/2015 | Yang | H04L 12/6418 455/419 |
| 2015/0365512 A1* | 12/2015 | MacKenzie | H04W 12/08 455/420 |
| 2015/0369014 A1 | 12/2015 | Gray et al. | |
| 2015/0371160 A1 | 12/2015 | Weatherhead et al. | |
| 2016/0072808 A1* | 3/2016 | David | H04L 9/3268 713/158 |
| 2016/0099970 A1* | 4/2016 | Grodzicki | H04W 12/08 726/29 |
| 2016/0104126 A1* | 4/2016 | Eleid | G06Q 10/20 705/305 |
| 2016/0107861 A1* | 4/2016 | Thebeau | B66B 1/3461 700/213 |
| 2016/0134686 A1* | 5/2016 | Youker | H04L 47/823 709/217 |
| 2016/0171455 A1* | 6/2016 | Eleid | G06Q 10/20 705/305 |
| 2016/0195864 A1* | 7/2016 | Kim | G05B 15/02 709/221 |
| 2016/0203407 A1* | 7/2016 | Sasaki | G06Q 10/20 706/11 |
| 2016/0259315 A1* | 9/2016 | Alexander | G05B 19/401 |
| 2016/0270021 A1* | 9/2016 | Wu | H04L 67/32 |
| 2016/0277391 A1* | 9/2016 | Choyi | G06F 21/64 |
| 2016/0289043 A1 | 10/2016 | Fang et al. | |
| 2016/0294819 A1* | 10/2016 | Salmela | H04W 4/70 |
| 2016/0295196 A1 | 10/2016 | Finn et al. | |
| 2016/0355375 A1* | 12/2016 | Simcik | B66B 1/468 |
| 2016/0357176 A1* | 12/2016 | Chand | G05B 19/4185 |
| 2016/0376124 A1* | 12/2016 | Bunter | B66B 1/468 187/247 |
| 2017/0006135 A1* | 1/2017 | Siebel | H04L 67/02 |
| 2017/0008162 A1* | 1/2017 | Tsubota | G05B 19/00 |
| 2017/0010099 A1* | 1/2017 | Simcik | G01S 1/68 |
| 2017/0046024 A1* | 2/2017 | Dascola | H04M 1/72522 |
| 2017/0073187 A1* | 3/2017 | Youker | B66B 3/008 |
| 2017/0076408 A1* | 3/2017 | D'Souza | G06Q 40/00 |
| 2017/0093815 A1* | 3/2017 | Chen | H04L 9/0841 |
| 2017/0098447 A1* | 4/2017 | Fu | |
| 2017/0105129 A1 | 4/2017 | Teplin et al. | |
| 2017/0171306 A1 | 6/2017 | Lucas et al. | |
| 2017/0171359 A1* | 6/2017 | Ando | H04Q 9/00 |
| 2017/0201504 A1* | 7/2017 | Funk | H04L 63/0471 |
| 2017/0234566 A1* | 8/2017 | Gerszewski | H04W 4/33 700/276 |
| 2017/0237576 A1* | 8/2017 | Gerszewski | G05B 15/02 700/276 |
| 2017/0243417 A1* | 8/2017 | Manikantan Shila | H04L 63/108 |
| 2017/0272316 A1 | 9/2017 | Johnson et al. | |
| 2017/0285623 A1* | 10/2017 | Figoli | G05B 19/41855 |
| 2017/0289824 A1* | 10/2017 | Figoli | H04W 24/02 |
| 2017/0291800 A1* | 10/2017 | Scoville | H04W 76/10 |
| 2017/0297864 A1* | 10/2017 | Koivisto | B66B 1/463 |
| 2017/0346802 A1* | 11/2017 | Gruskin | H04L 63/08 |
| 2017/0355554 A1* | 12/2017 | Eleid | B66B 3/002 |
| 2017/0357253 A1* | 12/2017 | Kilpatrick | G05B 23/0264 |
| 2018/0014144 A1* | 1/2018 | Chen | H04L 45/745 |
| 2018/0022574 A1* | 1/2018 | Pasini | B66B 1/2466 187/247 |
| 2018/0024847 A1* | 1/2018 | Campbell | G06F 9/453 715/708 |
| 2018/0083982 A1* | 3/2018 | Asenjo | H04L 63/0428 |
| 2018/0109929 A1* | 4/2018 | Ly | H04W 4/06 |
| 2018/0118512 A1* | 5/2018 | Baldi | B66B 1/468 |
| 2018/0121072 A1* | 5/2018 | Baldi | H04L 67/12 |
| 2018/0123784 A1* | 5/2018 | Gehrmann | H04L 9/0833 |
| 2018/0150806 A1* | 5/2018 | Eleid | B66B 25/006 |
| 2018/0157482 A1* | 6/2018 | Kirchhoff | B66B 1/34 |
| 2018/0183882 A1* | 6/2018 | Flynn | H04W 4/70 |
| 2018/0208430 A1* | 7/2018 | Koivisto | H04W 12/069 |
| 2018/0215578 A1* | 8/2018 | Kusserow | B66B 5/0031 |
| 2018/0284735 A1* | 10/2018 | Celia | G05B 23/024 |
| 2018/0293587 A1* | 10/2018 | Oda | G06Q 30/06 |
| 2018/0314512 A1* | 11/2018 | Schonauer | H04L 63/0442 |
| 2018/0373304 A1* | 12/2018 | Davis | G05B 15/02 |
| 2018/0375680 A1* | 12/2018 | Wright | G08B 25/10 |
| 2018/0375720 A1* | 12/2018 | Yang | H04L 29/08 |

FOREIGN PATENT DOCUMENTS

| | | |
|---|---|---|
| CN | 101909345 | 3/2013 |
| CN | 104731078 A | 6/2015 |
| CN | 105684482 A | 6/2016 |
| EP | 2599260 B1 | 6/2014 |
| JP | 2010278553 | 12/2010 |
| WO | 2011104807 A1 | 9/2011 |
| WO | 11154212 A1 | 12/2011 |
| WO | 2015056009 A1 | 4/2015 |
| WO | 2017063884 A1 | 4/2017 |

OTHER PUBLICATIONS

Larry O'Brien, Leveraging New Automation Approaches Across the Plant Lifecycle, Jun. 22, 2017, 5 pages.

Search Report for European Application No. 18203734.1; Application Filing Date Oct. 31, 2018; dated Jan. 8, 2019 (8 pages).

Office Action issued in European Application No. 18203734.1; Application Filing Date Oct. 31, 2018; dated Dec. 1, 2020 (8 pages).

(56) References Cited

OTHER PUBLICATIONS

First Office Action for Chinese Application No. 201811306067; filed Nov. 2, 2018; dated May 27, 2021 (16 pages).

* cited by examiner

ADHOC PROTOCOL FOR COMMISSIONING CONNECTED DEVICES IN THE FIELD

FIELD

Background

Non-limiting embodiments relate generally to component installation procedures, and more particularly, to passenger conveyor component installation and commissioning procedures.

Various control system such as passenger conveyor systems, for example, employ components or devices such as printed circuit boards (PCBs) that include hardware controllers which are typically configured to operate in a particular host system (e.g., an elevator system). The components are commissioned at the manufacturing facility before being deployed into the field or to a site operating the host passenger conveyor system. Deploying and commissioning these components can involve various setup tasks, along with a certain degree of steps and procedures to be executed inside the boundaries of the device manufacturer's production facility. The procedures include, but are not limited to, deploying certificates, and configuring software protocols, as well as employing contract specific data items pertaining to the passenger conveyor system.

Traditional control system components must typically be configured and setup in the production facility compounds before being deployed to a particular destination in the field, e.g., the site containing the passenger conveyor system. In addition, replacement components and deployment configuration changes are typically configured according to a specific target deployment setup. Thus, flexibility in deciding where to deploy a device is may be restricted.

BRIEF DESCRIPTION

According to a non-limiting embodiment, a device commissioning system includes a terminal device, a data communication network, and a network controller. The terminal devices selects a device type of a component configured to operate in a control system, and outputs a device activation signal that requests a configuration file for commissioning the component according to a selected device type. The communication network is remotely located from the component and stores configuration files for commissioning different types of components. The network controller receives the device activation signal indicating a request to commission the component according to the selected device type and establishes a secure data link to deliver the configuration file in response to the device activation signal. The component receives the configuration file corresponding to the selected device type, and installs the configuration file to commission operation as the selected device type The device commissioning system further includes a feature wherein the component excludes at least one configuration file prior to the terminal device outputting the device activation signal.

The device commissioning system further includes a feature wherein the secure data link is established directly between the data communication network and the component.

The device commissioning system further includes a feature wherein the secure data link is established between the data exchange network and the terminal device.

The device commissioning system further includes a feature wherein the terminal device receives the at least one configuration file via the secure data link, and delivers the received at least one configuration file to the component.

The device commissioning system further includes a feature wherein the data communication network includes a contract data uploading system configured to receive contract data corresponding to the control system, the contract data indicating information of the control system corresponding to the component, a data server configured to store the contract data obtained by the contract data uploading system and the at least one configuration file, an application programming interface (API) configured to operate as an abstraction layer that allows the component to perform different functions according to device type selected at the terminal device, and an internet-of-things (IoT) inter-network configured to establish a signal communication between the component and the network controller following the commissioning.

The device commissioning system further includes a feature wherein at least one configuration file for commissioning the component is generated based on the contract data of the control system corresponding to the component.

The device commissioning system further includes a feature wherein the terminal device is installed with a service tool (SVT) software application (APP) that provides a service technician with an interface to invoke data communication with the data network and the component, and to select the device type of the components among a plurality of different device types.

The device commissioning system further includes a feature wherein the device activation signal includes a device identification (ID) information corresponding to the component.

The device commissioning system further includes a feature wherein the device ID information includes at least one of a unique ID code assigned to the component, a serial number, a model type, hardware specifications and public encryption key.

The device commissioning system further includes a feature wherein the terminal device obtains the device ID information from the component.

The device commissioning system further includes a feature wherein the terminal device is configured to exchange data with the component, and wherein the component transmits the device ID information to the terminal device in response to receiving a device ID request signal from the terminal device.

The device commissioning system further includes a feature wherein the terminal device obtains the device ID information in response to scanning a machine-readable optical label included with the component.

The device commissioning system further includes a feature wherein the component includes at least one of an electronic hardware controller configured to control the control system, and a graphical user interface (GUI) control panel configured to receive elevator call requests and display elevator assignment information, floor destination information.

The device commissioning system further includes a feature wherein the terminal device includes at least one of a smart phone, a tablet computer, and a laptop computer.

According to another non-limiting embodiment, an electronic data communication network comprises a data server, and a network controller. The data server is configured to store at least one configuration file for commissioning different types of components located remotely from the data communication network. The network controller is configured to receive a device activation signal from a terminal device indicating a request to commission a selected device type corresponding to a deployed component, and to establish a secure data link configured to deliver the at least one configuration file corresponding to the selected device. The deployed component receives at least one configuration file corresponding to the selected device type, and automatically installs the at least one configuration file to commission operation as the selected device type.

The electronic data communication network includes another feature wherein the secure data link is established directly between the data communication network and the deployed component.

The electronic data communication network includes another feature wherein the secure data link is established directly between the data exchange network and the terminal device such that the terminal device receives the at least one configuration file, and delivers the received at least one configuration file to the deployed component.

According to yet another not-limiting embodiment, a method for commissioning a component deployed onsite of a control system comprises storing, via a data server installed in the data communication network remotely located from the deployed component. The configuration files are configured to commission different types of components. The method further comprises selecting, via an electronic terminal device, a device type of the deployed component, and outputting, via the terminal device, a device activation signal that requests at least one configuration file for commissioning the deployed component according to the selected device type. The method further comprises receiving the device activation signal at a network controller installed in the data communication network, and establishing a secure data link to deliver the at least one configuration file from the data communication network in response to the device activation signal. The method further comprises delivering the at least one configuration file corresponding to the selected device to the deployed component, and installing the at least one configuration file on the deployed component to commission operation as the selected device type.

The method further comprises deploying the component without at least one configuration file prior to outputting the device activation signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. In addition, descriptions of providing various procedures for configuring, setting up, and establishing operation of a passenger conveyor system device is referred to hereon as "device commissioning."

Various embodiments of the disclosure provide a device commissioning system capable of being executed "ad-hoc" to commission a component deployed in the field or on-site of a host control system. such as, for example, a passenger conveyor system or elevator system With respect to elevator systems, for example, one or more non-limiting embodiments provides a device commissioning system that establishes various preconditions including, but not limited to, a unique and unalterable data exchange which is accessible to a service technician operating on a given conveyor system, which identifies passenger conveyor devices, an active connection between a passenger conveyor device and a trusted system of the manufacturer, and an active connection to the trusted system and the service technician using an authentication resource initiates a secure data link for exchange data.

The device commissioning system according to various non-limiting embodiments described herein allows non-configured passenger conveyor devices (e.g., devices that are not installed with one or more configuration files corresponding to a particular device type and/or passenger conveyor system) to be shipped generically with the possibility to be configured in the field for a range of applications or functions provided by a selected device type. Passenger conveyor devices can also be re-purposed or re-configured without being sent back to the producing entity's compounds or manufacturing facility.

Over time, passenger conveyor system devices implemented in a passenger conveyor system can become damaged or inoperable thereby requiring replacement. The device commissioning system allows a failed device to be replaced with a new device which may have already been deployed into the field without initially being configured. As a result, it is unnecessary to notify the manufacturing facility of a device's use case, or limit a device to an intended functionality before deploying the device into the field.

Figure 1:
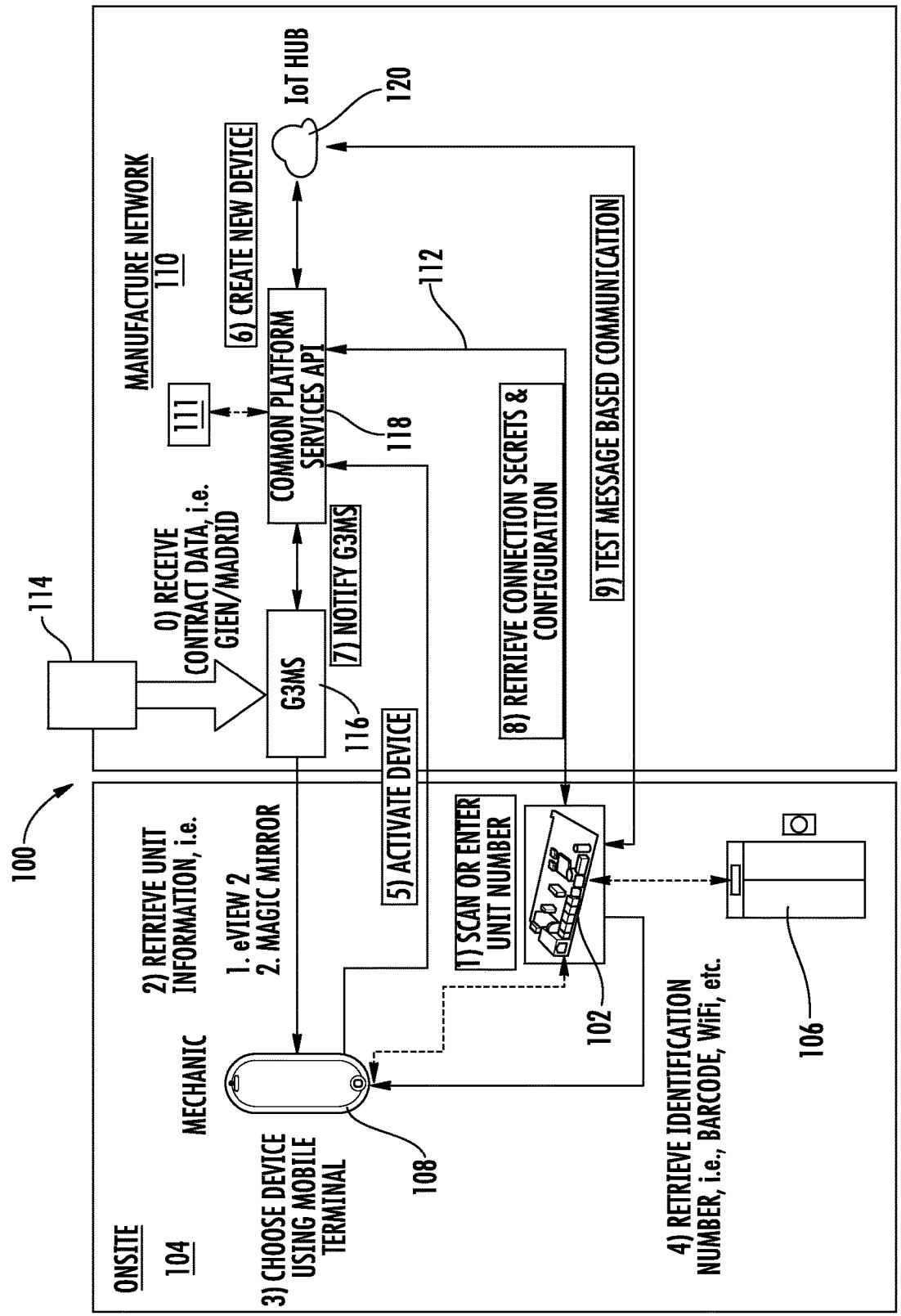
FIG. 1 is a diagram of a device commissioning system according to a non-limiting embodiment.

With reference now to FIG. 1, a device commissioning system 100 for commissioning a non-configured component 102 is illustrated according to a non-limiting embodiment. Although the device commissioning system 100 is described with reference to a passenger conveyor system 106 such as an elevator system 106, for example, the device commissioning system 100 is not limited thereto. For example, the device commissioning system 100 can be utilized in connection with other control system environments including, but not limited to, heating, cooling and ventilation (HVAC) systems, security systems, and fire alarm systems.

The non-configured passenger conveyor component 102 is deployed in the field, and is capable of operating onsite 104 with a corresponding or host passenger conveyor system 106 once installed with the appropriate configuration files. Although the passenger conveyor component 102 is deployed without having configuration files installed therein, the passenger conveyor component 102 may be initially deployed with various software files and data that allows for ad-hoc onsite commissioning. In at least one non-limiting embodiment, the passenger conveyor component 102 is deployed with hardware identification (ID) information, a unique private/public key pair, a public key/certificate, a model number, firmware version, and a commissioning API URL used to request signal communication with a remotely located data communications network 110 that stores one or more configuration files necessary for commissioning the component 102.

The passenger conveyor component 102 includes, but is not limited to, printed circuit board (PCB) 102 containing an electronic hardware controller configured to control the passenger conveyor system 106. The passenger conveyor component 102 can also include a graphical user interface (GUI) control panel configured to receive elevator call requests and display elevator assignment information, floor destination information, etc. The passenger conveyor system 106 includes, for example, an elevator system, an escalator system or a moving walk way.

The device commissioning system 100 includes a terminal device 108, an electronic data communication network 110, and a network controller 111. The terminal device 108 is configured to electrically communicate with the passenger conveyor component 102 configured to operate the conveyor system 106 (e.g., an elevator) and the data communication network 110 to facilitate commissioning of the passenger conveyor component 102. The terminal device 108 can be implemented as various electronic communication devices including, but not limited to, a smart phone, a tablet computer, and a laptop computer. The terminal device 108 is installed with a service tool (SVT) or other configuration software application (APP) that provides a service technician with an interface to invoke data communication with the data network 110 and the passenger conveyor component 102. The SVT APP interface also allows the service technician to select a device type of the passenger conveyor device among a plurality of different device types as discussed in greater detail below.

A service technician can utilize the terminal device 108 to initiate the process for commissioning the non-configured passenger conveyor component 102 used to operate with a host conveyor system (e.g., an elevator or elevator system). For instance, a service technician executes the SVT APP installed on the terminal device 108 and selects a desired device type of the passenger conveyor component 102. For example, the service technician can select "elevator controller" from the SVT APP in order to commission the non-configured component 102 as an elevator controller for a particular elevator system 106. Once commissioned, the component 102 can control various operations of the elevator system 106 including, but not limited to, elevator calls, floor assignments, etc. In another example, the service technician can select "elevator GUI control panel" to commission the non-configured component 102 as a GUI control panel included in a particular elevator system 106. Once commissioned, the component 102 can receive elevator call requests, display elevator assignment information, floor destination information, etc.

After selecting the device type, the service technician then obtains device identification (ID) information corresponding to the passenger conveyor component 102. The device ID information includes, but not limited to, a unique ID code assigned to the passenger conveyor component 102, a serial number of the physical component 102, model type of the physical component 102, and hardware specifications of the physical component 102. The terminal device 108 is configured to exchange data with the passenger conveyor component 102 wirelessly (e.g., via Bluetooth transmission) or by wire (e.g., using USB connections). In at least one embodiment, the passenger conveyor component 102 can wirelessly transmit the device ID information to the terminal device 108 in response to receiving a device ID request signal.

The device ID information can also be labeled on the passenger conveyor component 102. For example, the passenger conveyor device can be deployed with a label such as for example, a machine-readable optical label including, but not limited to a barcode and a quick response (QR) code. Accordingly, the terminal device 108 can obtain the device ID information in response to optically scanning the machine-readable optical label via an integrated camera system or other optical sensor. A label displaying specific device ID information can also be adhered to the physical component 102 so that a service technician can manually inputs the device ID information into the terminal device 108 to output a device activation signal to the passenger conveyor system 106 that requests configuration files or connection string for commissioning the passenger conveyor component 102 according to the selected device type.

The electronic data communication network 110 is remotely located from the passenger conveyor component 102 and the terminal device 108. In one example, the data communication network 110 can be operated by a manufacturer of the passenger conveyor component 102. In at least one non-limited embodiment, the data communication network 110 is implemented as a cloud-computing network, and can store configuration files for commissioning different types of passenger conveyor devices 102 configured to operate with the passenger conveyor system 106. The configuration files or connection string include, but are not limited to, connection secrets, protocol data, a shared access secrete token, public or private keys, authentication certificates, a password, etc. The electronic data communication network 110 is also configured to establish a secure data link 112 with the passenger conveyor component 102. In this manner, the passenger conveyor component 102 can receive the configuration files corresponding to a selected device type, and automatically initiate commissioning as discussed in greater detail below.

The data communication network 110 includes a contract data uploading system 114, a data server 116, an application programming interface (API) 118, and an internet-of-things (IoT) inter-network 120. The contract data uploading system 114, data server 116, application programming interface (API) 118, and internet-of-things (IoT) inter-network 120 can each be installed in the cloud-based data communication network 110, but the invention is not limited thereto.

The contract data uploading system 114 is configured to receive contract data corresponding to a given passenger conveyor system 106. The contract data is used to generate at least one configuration file or a connection string for commissioning a passenger conveyor device to operate with a given passenger conveyor system. The contract data includes, but not limited to, a conveyor system type (e.g., elevator system, escalator system, moving walkway), performance data, and index data that maps the passenger conveyor system to one or more passenger system devices commissioned to operate with a given passenger conveyor system. Accordingly, the data server 116 can store the contract data obtained by the contract data uploading system and the configuration files.

The application programming interface (API) 118 is configured to operate as an abstraction layer that allows the passenger conveyor component 102 to perform different functions according to device type selected by the terminal device 108. In at least one embodiment, the API 118 is serves as an interface used by other systems/services (e.g. terminal device 108) to interact (e.g. transfer configuration data) with a specific component 102 or a group of components 102.

The IoT inter-network 120 is configured to establish a data link with the passenger conveyor component 102 after completing commissioning. The IoT inter-network 120 serves to establish data communication between the network controller 111 and a plurality of different passenger conveyor devices located remotely from one another. The IoT inter-network 120 also can facilitate test message based communication and data exchange between a commissioned passenger conveyor device and the data communication network 110.

The network controller 111 can be installed in the data communication network 110, or can be located remotely therefrom. In at least one non-limiting embodiment, the network controller 111 is configured to receive a device activation signal from the terminal device 108 indicating a request to commission a selected device type. The activation request signal can include the device identification (ID) information corresponding to the passenger conveyor component 102, and the device type selected by the maintenance technician located in the field (e.g., onsite 104 and in possession of the passenger conveyor component 102). In response to receiving the device activation signal, the network controller 111 operates to establish a secure data link 112 between the data communication network 110 and the passenger conveyor component 102. In this manner, the passenger conveyor component 102 receives configuration files corresponding to the selected device type via the secured data link 112, and an installs the configuration files to invoke operation as the selected device type.

Figure 2A:
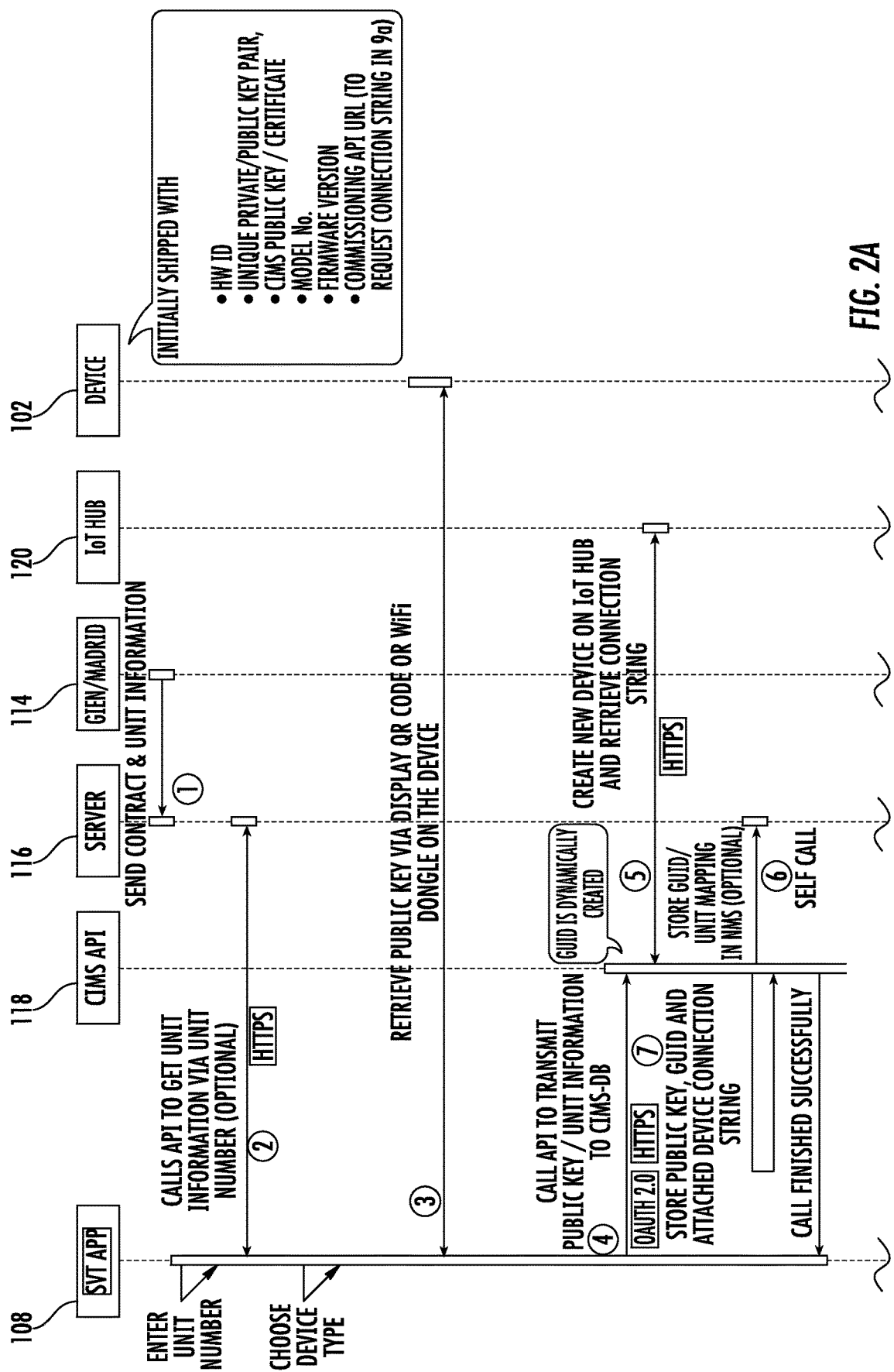
FIGS. 2A-2C are a signal flow diagram illustrating an exchange of signals occurring when commissioning a passenger conveyor device deployed in the field according to a non-limiting embodiment.
Figure 2B:
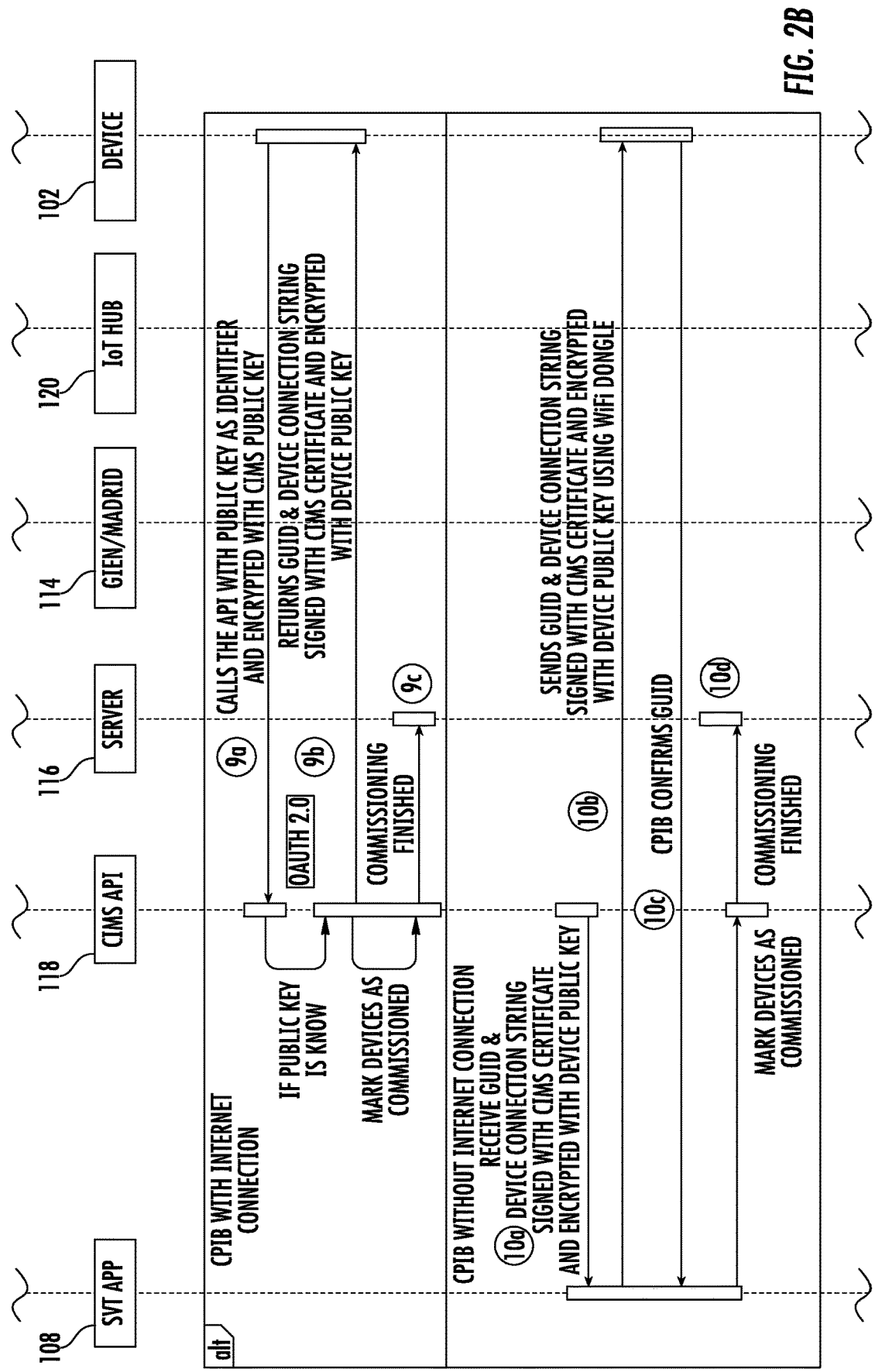
Figure 2C:
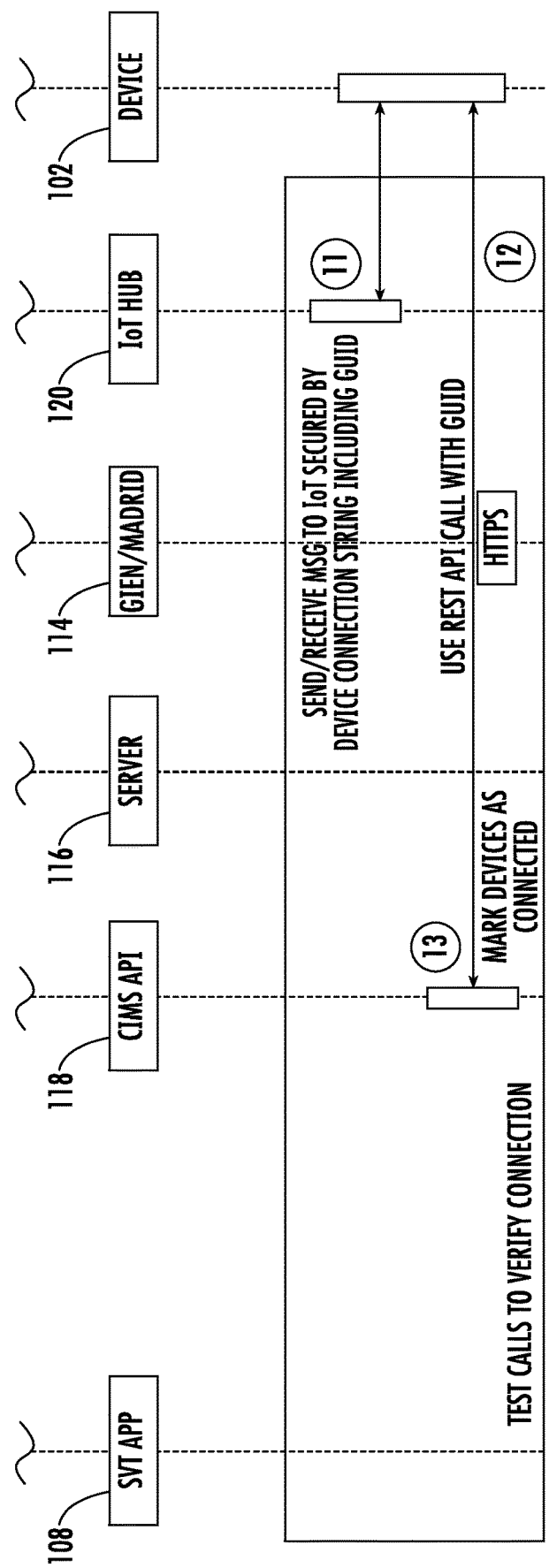

Turning now to FIGS. 2A-2C, a signal flow diagram illustrates an exchange of signals occurring when commissioning a passenger conveyor component 102 deployed in the field according to a non-limiting embodiment. In order to commission a non-configured passenger conveyor component 102, the appropriate configuration files necessary to operate with a corresponding passenger conveyor system 106 must be available for retrieval and delivery to the component 102. Therefore, configuration files are generated according to contract data uploaded via a contract data uploading system 114, and stored in a network server 116 at operation 1. The contract data includes, for example, the type of conveyor system (e.g., elevator system, escalator system, moving walkway), performance data, and index data that maps the passenger conveyor system to one or more passenger system devices commissioned to operate with a given passenger conveyor system.

At operation 2, a service technician selects the type of device of which to commission the non-configured passenger conveyer component 102. The device can be selected using a SVT APP installed on a terminal device 108 operated by the service technician.

At operation 3, the service technician obtains device ID information and a public key associated with the passenger conveyor component 102. The public key can include a unique device ID that is obtained by scanning an optical machine-readable label (e.g., QR code) included with the component 102. In at least one embodiment, the component 102 includes a display unit, which automatically displays the device ID information (e.g., QR code) once powered on. The terminal device 108 can also communicate wireless with the passenger conveyor component 102 to obtain the device ID information and a public key.

At operation 4, the terminal device 108 transmits an activation request signal to the data communication network 110. The activation request signal can contain the selected device type, device ID information, and a public key obtained by the terminal device 108. In at least one embodiment, the activation request signal is received by an API 118, which then relays the activation request signal to a network controller 111 configured to operate the data communication network 110. Once the activation signal is verified and approved by the data communication network (e.g., the network controller 111), a Globally Unique Identifier (GUID) is dynamically generated. The Globally Unique Identifier is assigned to each single 102 device for identification purposes.

At operation 5, a new device entry corresponding to the passenger conveyor component 102 is generated and stored in the network server 116. In addition, the network controller 111 can communicate with the IoT inter-network 120 to register the passenger conveyor component 102. Once registered, the IoT inter-network 120 generates a new connection string for the passenger conveyor component 102 and delivers the connection string to the network controller 111. The connection string can include, but is not limited to, configuration files, protocols, a shared access secrete token, public or private keys, authentication certificates, a password etc. At operation 6, the network controller 111 maps the network string (including the configuration files) to the passenger conveyor component 102. The mapping and/or the network string is then stored in the network server 106 for future reference at operation 7. Accordingly, verification of the passenger conveyor component 102 is completed at operation 8, and the passenger conveyor component 102 can proceed to communicate with the data communication network 110 to download and install the configuration files corresponding to the selected device type.

When the passenger conveyor component 102 is equipped with WiFi communication capability or Internet connection, the component 102 proceeds to operation 9a and wirelessly transmits a commission request signal that is received by the network controller 111 via the API 118. In at least one embodiment, the commission request signal includes the device ID information (e.g., the public key). The device ID information can also be encrypted with a network key initially installed on the component 102. At operation 9b, the network controller maps the received device ID information to the device entry data stored in network server to verify the commission request output by the passenger conveyor component 102. When the device ID information matches the device entry data, the network controller verifies the passenger conveyor component 102 and establishes a secure data link 112 between the data communication network 110 and the component 102. Once verified, the configuration file corresponding to the selected device type is transmitted to the component 102 via the secure data link 112. Upon completing installation of the configuration files, the passenger conveyor component 102 outputs an acknowledgment (ACK) signal indicating installation of the configuration files is complete, and the data communication network marks the passenger conveyor component 102 as being commissioned at operation 9c. Accordingly, the passenger conveyor component 102 can operate in the passenger conveyor system 106 according to the selected device type.

When the passenger conveyor component 102 is not equipped with WiFi communication capability or Internet connection, downloading of the configuration files is initiated using the terminal device 108 at operation 10a. In at least one embodiment, once verification of the passenger conveyor component 102 is completed at operation 8, the network controller 111 facilitates delivery of the network signed connection string (e.g. the connection string signed with an authenticated network certificate) from the data communication network 110 to the terminal device 108. The connection string can also be encrypted with the public key obtained from the passenger conveyor component 102 and include the configuration files corresponding to the device type selected at operation 2.

At operation 10b, the terminal device 108 relays the connection string (including the configuration files) to the passenger conveyor component 102. The connection string can be communicated either wirelessly (e.g., by Bluetooth) or through a wired connection using, for example, a USB connection between the passenger component 102 and the terminal device 108. Once the configuration files are installed, the passenger conveyor component 102 outputs an acknowledgment (ACK) signal indicating installation of the configuration files is complete. The terminal device 108 relays the ACK signal to the network controller 111 via the API 118, and the passenger conveyor component 102 is marked as being commissioned at operation 10d. Accordingly, the passenger conveyor component 102 can operate in the passenger conveyor system 106 according to the selected device type.

In at least one embodiment, the device commissioning system 100 can perform a connection verification test as shown in FIG. 2C. Once the passenger conveyor component 102 is marked as commissioned, the component 102 sends a connection confirmation message secured by the device's assigned connection string to the IoT inter-network 120 at operation 11. When the connection confirmation message is confirmed, the IoT inter-network 120 returns a GUID to the component 102. At operation 12, the component 102 delivers the GUID received from the IoT inter-network 120 to the controller network 111 via the API 118, and the device 108 is marked as connected at operation 13.

As described herein, a device commissioning system is provided, which is capable of being executed "ad-hoc" to commission a non-configured passenger conveyor device (e.g., devices that are not installed with configuration files corresponding to a particular device type and/or passenger conveyor system) deployed in the field. Accordingly, the device commissioning system allows a non-configured passenger conveyor devices to be shipped generically with the possibility to be configured in the field for a range of applications or functions corresponding to a subsequently selected device type. The device commissioning system also allows passenger conveyor devices to be re-purposed or re-configured without being sent back to the producing entity compounds. The device commissioning system also facilitates replacement of a failed device with a functioning non-configured device which may have already been deployed into the field.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A device commissioning system comprising:
    an electronic terminal device including at least one device selected from the group comprising a smart phone, a tablet computer, and a laptop computer, the terminal device configured to select a device type of a component configured to operate in a control system from a plurality of different types of components configured to operate in the control system, and to output a device activation signal that requests at least one configuration file for commissioning the component according to a selected device type;
    an application programming interface (API) configured to operate as an abstraction layer that allows the component to perform different functions according to device type selected at the terminal device;
    an electronic data communication network remotely located from the component, the data communication network configured to store the at least one configuration file for commissioning the different types of components;
    a network controller configured to receive the device activation signal indicating a request to commission the component according to the selected device type, and to establish a secure data link to deliver the at least one configuration file in response to the device activation signal; and
    a contract data uploading system configured to receive contract data corresponding to a passenger conveyor system, and to generate the at least one configuration file for commissioning different types of components to operate with the passenger conveyor system based on contract data,
    wherein the component receives the at least one configuration file corresponding to the selected device type, and installs the configuration files to commission operation as the selected device type, the component including a controller configured to control a selected control system,
    wherein the secure data link is established between the data exchange network and the terminal device, and wherein the terminal device receives the at least one configuration file via the secure data link, and delivers the received at least one configuration file to the component, and
    wherein the after installing the at least one configuration file, the controller controls the operations of the selected control system independently from the network controller, and
    wherein the component excludes the at least one configuration file prior to the terminal device outputting the device activation signal.

2. The device commissioning system of claim 1, wherein the secure data link is established directly between the data communication network and the component.

3. The device commissioning system of claim 1, wherein the data communication network further comprises:
    a contract data uploading system configured to receive contract data corresponding to the control system, the contract data indicating information of the control system corresponding to the component;
a data server configured to store the contract data obtained by the contract data uploading system and the at least one configuration file; and
an internet-of-things (IoT) inter-network configured to establish a signal communication between the component and the network controller following the commissioning.

4. The device commissioning system of claim 3, wherein at least one configuration file for commissioning the component is generated based on the contract data of the control system corresponding to the component.

5. The device commissioning system of claim 1, wherein the terminal device is installed with a service tool (SVT) software application (APP) that provides a service technician with an interface to invoke data communication with the data network and the component, and to select the device type of the components among a plurality of different device types.

6. The device commissioning system of claim 5, wherein the device activation signal includes a device identification (ID) information corresponding to the component.

7. The device commissioning system of claim 6, wherein the device ID information includes at least one of a unique ID code assigned to the component, a serial number, a model type, hardware specifications and public encryption key.

8. The device commissioning system of claim 6, wherein the terminal device obtains the device ID information from the component.

9. The device commissioning system of claim 8, wherein the terminal device is configured to exchange data with the component, and wherein the component transmits the device ID information to the terminal device in response to receiving a device ID request signal from the terminal device.

10. The device commissioning system of claim 8, wherein the terminal device obtains the device ID information in response to scanning a machine-readable optical label included with the component.

11. The device commissioning system of claim 1, wherein the component includes at least one of an electronic hardware controller configured to control the control system, and a graphical user interface (GUI) control panel configured to receive elevator call requests and display elevator assignment information, floor destination information.

12. The device commissioning system of claim 1, wherein the terminal device includes at least one of a smart phone, a tablet computer, and a laptop computer.

13. An electronic data communication network comprising:
a contract data uploading system configured to receive contract data corresponding to a passenger conveyor system, and to generate at least one configuration file for commissioning different types of components to operate with the passenger conveyor system based on the contract data;
a data server configured to store the at least one configuration file for commissioning the different types of components located remotely from the data communication network;
an application programming interface (API) configured to operate as an abstraction layer that allows the component to perform different functions according to device type selected at the terminal device; and
a network controller configured to receive a device activation signal from a terminal device indicating a request to commission a selected device type corresponding to a deployed component, and to establish a secure data link configured to deliver the at least one configuration file corresponding to the selected device;
wherein the deployed component receives at least one configuration file corresponding to the selected device type, and automatically installs the at least one configuration file to commission operation as the selected device type, the deployed component including a controller configured to control operations of a selected control system,
wherein the secure data link is established directly between the data communication network and the deployed component, and wherein the secure data link is established directly between the data exchange network and the terminal device such that the terminal device receives the at least one configuration file, and delivers the received at least one configuration file to the deployed component, and
wherein the after installing the at least one configuration file, the controller controls the operations of the selected control system independently from the network controller.

14. A method for commissioning a component deployed onsite of a control system, the method comprising:
receiving, via a contract data uploading system, contract data corresponding to a passenger conveyor system;
generating, via the contract data uploading system, at least one configuration file for commissioning different types of components to operate with the passenger conveyor system based on the contract data;
storing, via a data server installed in the data communication network remotely located from the deployed component, the at least one configuration file for commissioning the different types of components;
selecting, via an electronic terminal device, a device type of the deployed component from a plurality of different device types configured to operate in the control system;
operating, via an application programming interface (API), an abstraction layer that allows the component to perform different functions according to device type selected at the terminal device;
outputting, via the terminal device, a device activation signal that requests at least one configuration file for commissioning the deployed component according to the selected device type;
receiving the device activation signal at a network controller installed in the data communication network;
establishing a secure data link to deliver the at least one configuration file from the data communication network in response to the device activation signal; and
delivering the at least one configuration file corresponding to the selected device to the deployed component, and installing the at least one configuration file on the deployed component to commission operation as the selected device type,
controlling, via a controller included with the deployed component, operations of a control system independently from the network controller,
wherein the secure data link is established directly between the data communication network and the deployed component, and wherein the secure data link is established directly between the data exchange network and the terminal device such that the terminal device receives the at least one configuration file, and delivers the received at least one configuration file to the deployed component.

15. The method of claim 14, further comprising deploying the component without at least one configuration file prior to outputting the device activation signal.

* * * * *